F. D. COOK.
ROOFING.
APPLICATION FILED JUNE 21, 1909.
957,937.
Patented May 17, 1910.
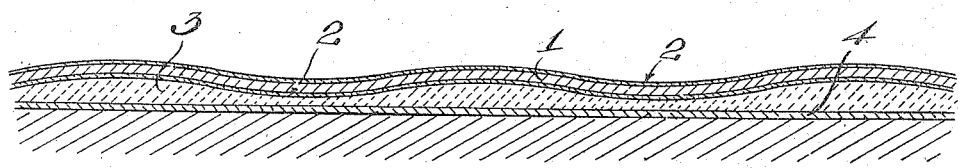
Witnesses
C. H. Griesbauer
Inventor
F. D. Cook
By H. B. Willson & Co
Attorneys

UNITED STATES PATENT OFFICE.

FREDERICK D. COOK, OF BLAIRSVILLE, PENNSYLVANIA.

ROOFING.

957,937.

Specification of Letters Patent. Patented May 17, 1910.

Application filed June 21, 1909. Serial No. 503,529.

*To all whom it may concern:*

Be it known that I, FREDERICK D. COOK, a citizen of the United States, residing at Blairsville, in the county of Indiana and State of Pennsylvania, have invented certain new and useful Improvements in Roofing; and I do declare the following to be a full, clear, and exact description of the invention, such as will enable others skilled in the art to which it appertains to make and use the same.

This invention relates to metal roofing and consists in providing a roofing which will be damp-proof, and proof against the corrosive action of the weather and sweating in cold weather.

In the accompanying drawing, the figure is a longitudinal section of the roofing.

In practice, the roofing is made by covering the metal 1 upon both sides with a layer, as 2, of glass or enamel in a finely ground or liquid state, and then subjecting the same to a heat sufficient to fuse the enamel or glass in order to cause it to melt and flow evenly over the surfaces of the sheet metal, and to enter the pores thereof, whereby the enamel or glass is caused to firmly adhere to the sheet metal. The sheet metal may be corrugated and before it is coated in the manner above described it is first cleaned by sand blast or acid to remove all scale or incrustation therefrom. This vitreous coating thoroughly protects the sheet metal from rust and thereby greatly prolongs the life of same.

To guard against sweating of the roofing in cold weather, in such places where it is subjected to vapors from the under side, a layer of cement 3 is applied to the under layer of enamel or glass and a thin sheet of flexible material 4, such as paper or felt, applied to the cement layer.

From the foregoing description taken in connection with the accompanying drawing, it is thought that the manner in which the roofing is made will be clearly understood without requiring a more extended explanation.

Various changes in the form, proportion and the minor details of construction may be resorted to without departing from the principle or sacrificing any of the advantages of this invention as defined in the appended claim.

Having thus described and ascertained the nature of my invention, what I claim as new and desire to secure by Letters-Patent, is:—

A roofing consisting of sheet metal having both sides covered with a vitreous layer of enamel or glass, a layer of cement applied to one layer of the vitreous material and a layer of flexible material applied to the layer of cement.

In testimony whereof I have hereunto set my hand in presence of two subscribing witnesses.

FREDERICK D. COOK.

Witnesses:
GEORGE W. PHILIPS,
CHARLES H. MOORE.